(12) United States Patent
Jemella et al.

(10) Patent No.: US 7,660,764 B2
(45) Date of Patent: *Feb. 9, 2010

(54) SERVICE CHARGE ADJUSTMENT PLATFORM

(75) Inventors: Donald F. Jemella, Ossining, NY (US); Franca Montevago, North Bellmore, NY (US); John J Mannino, Kings Park, NY (US); Loretta Mirabella, East Norwich, NY (US)

(73) Assignee: JPMorgan Chase Bank, NA, New York, NY (US)

( * ) Notice: Subject to any disclaimer, the term of this patent is extended or adjusted under 35 U.S.C. 154(b) by 202 days.

This patent is subject to a terminal disclaimer.

(21) Appl. No.: 11/508,847

(22) Filed: Aug. 24, 2006

(65) Prior Publication Data

US 2007/0043665 A1 Feb. 22, 2007

Related U.S. Application Data (63) Continuation of application No. 09/660,814, filed on Sep. 13, 2000, now Pat. No. 7,124,111.

(60) Provisional application No. 60/153,909, filed on Sep. 14, 1999.

(51) Int. Cl.
*G06Q 40/00* (2006.01)
(52) U.S. Cl. .............................. 705/38; 705/35; 705/37
(58) Field of Classification Search ................... 705/37, 705/38, 35

See application file for complete search history.

(56) References Cited

U.S. PATENT DOCUMENTS

| | | | |
|---|---|---|---|
| 4,321,672 A | 3/1982 | Braun et al. | |
| 4,355,372 A | 10/1982 | Johnson et al. | |
| 4,495,018 A | 1/1985 | Vohrer | |
| 4,633,397 A | 12/1986 | Macco | |

(Continued)

FOREIGN PATENT DOCUMENTS

JP 7-152960 6/1995

(Continued)

OTHER PUBLICATIONS

Delivering the Right Information to the Right Resource or Every Customer Interaction; Intelligent Callrouter, www.geotel.com/solutions/icr/default/htm, 1998, 1 page.

(Continued)

*Primary Examiner*—Jagdish N Patel
(74) *Attorney, Agent, or Firm*—Goodwin Procter, LLP (57) ABSTRACT

A method of providing a representative or customer with an opportunity to electronically process a request to adjust, refund or waive a service charge on various products and services, comprising the steps of a) receiving requests via various channels such as phone, facsimile, in person, on-line, etc.; b) maintaining an electronic site on a computer network which representative or customer may connect; c) presenting at least one electronic screen over the network to a representative or customer who has connected to the electronic site, including a first input field operable to receive a first command from the representative or customer indicative of a type of adjustment; d) electronically delivering the first command to an automated interface which converts a format of the first command to another format; and presenting a decision to the representative or customer in response to the first command.

27 Claims, 8 Drawing Sheets

U.S. PATENT DOCUMENTS

| | | |
|---|---|---|
| 4,694,397 A | 9/1987 | Grant et al. |
| 4,722,054 A | 1/1988 | Yorozu et al. |
| 4,745,468 A | 5/1988 | Von Kohorn |
| 4,752,877 A | 6/1988 | Roberts et al. |
| 4,774,664 A | 9/1988 | Campbell et al. |
| 4,797,911 A | 1/1989 | Szlam et al. |
| 4,812,628 A | 3/1989 | Boston |
| 4,914,587 A | 4/1990 | Clouse |
| 4,926,255 A | 5/1990 | Von Kohorn |
| 4,932,046 A | 6/1990 | Katz et al. |
| 4,948,174 A | 8/1990 | Thomson et al. |
| 4,972,504 A | 11/1990 | Daniel, Jr. |
| 4,974,878 A | 12/1990 | Josephson |
| 5,041,972 A | 8/1991 | Frost |
| 5,050,207 A | 9/1991 | Hitchcock |
| 5,121,945 A | 6/1992 | Thomson et al. |
| 5,157,717 A | 10/1992 | Hitchcock |
| 5,179,584 A | 1/1993 | Tsumura |
| 5,220,501 A | 6/1993 | Lawlor |
| 5,225,978 A | 7/1993 | Peterson |
| 5,259,023 A | 11/1993 | Katz |
| 5,260,778 A | 11/1993 | Kauffman |
| 5,287,269 A | 2/1994 | Dorrough et al. |
| 5,383,113 A | 1/1995 | Knight |
| 5,402,474 A | 3/1995 | Miller |
| 5,424,938 A | 6/1995 | Wagner |
| 5,465,206 A | 11/1995 | Hilt et al. |
| 5,483,445 A | 1/1996 | Pickering |
| 5,490,060 A | 2/1996 | Malec |
| 5,523,942 A | 6/1996 | Tyler et al. |
| 5,532,920 A | 7/1996 | Hartrick |
| 5,555,299 A | 9/1996 | Maloney et al. |
| 5,559,855 A | 9/1996 | Dowens et al. |
| 5,561,707 A | 10/1996 | Katz |
| 5,570,465 A | 10/1996 | Tsakanikas |
| 5,583,759 A | 12/1996 | Geer |
| 5,594,791 A | 1/1997 | Szlam et al. |
| 5,599,528 A | 2/1997 | Igaki |
| 5,615,341 A | 3/1997 | Agrawal et al. |
| 5,652,786 A | 7/1997 | Rogers |
| 5,659,165 A | 8/1997 | Jennings |
| 5,684,863 A | 11/1997 | Katz |
| 5,699,528 A | 12/1997 | Hogan |
| 5,710,889 A | 1/1998 | Clark et al. |
| 5,715,298 A | 2/1998 | Rogers |
| 5,715,450 A | 2/1998 | Ambrose |
| 5,727,249 A | 3/1998 | Pollin |
| 5,742,775 A | 4/1998 | King |
| 5,745,706 A | 4/1998 | Wolfberg et al. |
| 5,757,904 A | 5/1998 | Anderson |
| 5,758,126 A | 5/1998 | Daniels et al. |
| 5,761,647 A | 6/1998 | Boushy |
| 5,765,142 A | 6/1998 | Allred et al. |
| 5,774,879 A * | 6/1998 | Custy et al. .................. 705/35 |
| 5,787,403 A | 7/1998 | Randle |
| 5,793,846 A | 8/1998 | Katz |
| 5,794,221 A | 8/1998 | Egendorf |
| 5,802,498 A | 9/1998 | Comesanas |
| 5,802,499 A | 9/1998 | Sampson et al. |
| 5,815,551 A | 9/1998 | Katz |
| 5,819,238 A | 10/1998 | Fernholz |
| 5,826,241 A | 10/1998 | Stein |
| 5,832,447 A | 11/1998 | Rieker |
| 5,832,460 A | 11/1998 | Bednar |
| 5,835,087 A | 11/1998 | Herz |
| 5,835,580 A | 11/1998 | Fraser |
| 5,835,603 A | 11/1998 | Coutts |
| 5,842,211 A | 11/1998 | Horadan |
| 5,862,223 A | 1/1999 | Walker |
| 5,870,456 A | 2/1999 | Rogers |
| 5,870,721 A | 2/1999 | Norris |
| 5,870,724 A | 2/1999 | Lawlor |
| 5,873,072 A | 2/1999 | Kight |
| 5,875,437 A | 2/1999 | Atkins |
| 5,884,032 A | 3/1999 | Bateman |
| 5,884,288 A | 3/1999 | Chang |
| 5,890,140 A | 3/1999 | Clark et al. |
| 5,897,625 A | 4/1999 | Gustin |
| 5,899,982 A | 5/1999 | Randle |
| 5,903,881 A | 5/1999 | Schrader |
| 5,920,847 A | 7/1999 | Kolling et al. |
| 5,923,745 A | 7/1999 | Hurd |
| 5,940,811 A | 8/1999 | Norris |
| 5,943,656 A | 8/1999 | Crooks |
| 5,953,406 A | 9/1999 | LaRue et al. |
| 5,953,710 A * | 9/1999 | Fleming ....................... 705/38 |
| 5,966,695 A | 10/1999 | Melchione et al. |
| 5,966,698 A | 10/1999 | Pollin |
| 5,970,467 A | 10/1999 | Alavi |
| 5,974,396 A | 10/1999 | Anderson |
| 5,978,780 A | 11/1999 | Watson |
| 5,987,435 A | 11/1999 | Weiss et al. |
| 5,991,750 A | 11/1999 | Watson |
| 5,995,942 A | 11/1999 | Smith et al. |
| 5,995,948 A | 11/1999 | Whitford |
| 6,006,207 A | 12/1999 | Mumick et al. |
| 6,016,344 A | 1/2000 | Katz |
| 6,016,482 A | 1/2000 | Molinari et al. |
| 6,018,722 A | 1/2000 | Ray et al. |
| 6,026,370 A | 2/2000 | Jermyn |
| 6,029,139 A | 2/2000 | Cunningham et al. |
| 6,032,125 A | 2/2000 | Ando |
| 6,038,552 A | 3/2000 | Fleischl et al. |
| 6,049,782 A | 4/2000 | Gottesman et al. |
| 6,055,510 A | 4/2000 | Henrick et al. |
| 6,058,378 A | 5/2000 | Clark et al. |
| 6,070,147 A | 5/2000 | Harms et al. |
| 6,078,892 A | 6/2000 | Anderson et al. |
| 6,088,685 A | 7/2000 | Kiron et al. |
| 6,098,052 A | 8/2000 | Kosiba et al. |
| 6,100,891 A | 8/2000 | Thorne |
| 6,101,486 A | 8/2000 | Roberts et al. |
| 6,148,293 A | 11/2000 | King |
| 6,151,584 A | 11/2000 | Papierniak et al. |
| 6,157,924 A | 12/2000 | Austin |
| 6,212,178 B1 | 4/2001 | Beck et al. |
| 6,226,623 B1 | 5/2001 | Schein et al. |
| 6,230,287 B1 | 5/2001 | Pinard et al. |
| 6,233,332 B1 | 5/2001 | Anderson et al. |
| 6,233,566 B1 | 5/2001 | Levine et al. |
| 6,278,981 B1 | 8/2001 | Dembo et al. |
| 6,301,567 B1 | 10/2001 | Leong et al. |
| 6,304,653 B1 | 10/2001 | O'Neil et al. |
| 6,304,858 B1 | 10/2001 | Mosler et al. |
| 6,321,212 B1 | 11/2001 | Lange |
| 6,330,551 B1 * | 12/2001 | Burchetta et al. .............. 705/80 |
| 6,338,047 B1 | 1/2002 | Wallman |
| 6,393,409 B2 | 5/2002 | Young et al. |
| 6,405,179 B1 | 6/2002 | Rebane |
| 6,415,267 B1 | 7/2002 | Hagan |
| 6,418,419 B1 | 7/2002 | Nieboer et al. |
| 6,430,545 B1 | 8/2002 | Honarvar et al. |
| 6,456,983 B1 | 9/2002 | Keyes et al. |
| 6,480,850 B1 | 11/2002 | Veldhuisen |
| 6,513,019 B2 | 1/2003 | Lewis |
| 6,553,113 B1 | 4/2003 | Dhir et al. |
| 6,578,015 B1 | 6/2003 | Haseltine et al. |
| 6,658,393 B1 | 12/2003 | Basch et al. |
| 6,804,346 B1 | 10/2004 | Mewhinney |
| 2001/0032158 A1 | 10/2001 | Starkman |
| 2001/0032159 A1 | 10/2001 | Starkman |
| 2001/0032176 A1 | 10/2001 | Starkman |
| 2001/0034682 A1 | 10/2001 | Knight et al. |
| 2001/0042034 A1 | 11/2001 | Elliott |

| | | |
|---|---|---|
| 2001/0044293 A1 | 11/2001 | Morgan |
| 2001/0047489 A1 | 11/2001 | Ito et al. |
| 2002/0026394 A1 | 2/2002 | Savage et al. |
| 2002/0059141 A1 | 5/2002 | Davies et al. |
| 2003/0101119 A1 | 5/2003 | Persons et al. |
| 2003/0163403 A1 | 8/2003 | Chen et al. |
| 2003/0208441 A1 | 11/2003 | Poplawski et al. |

FOREIGN PATENT DOCUMENTS

| WO | WO 01/86524 | 11/2001 |
|---|---|---|

OTHER PUBLICATIONS

Global Corruption Report 2004, Transparency International, Pluto Press, www.globalcorrupt, ISBN 07453 2231, Jun. 26, 2005.

Rial, Astrid, How to Monitor Collectors, Credit Card Management, Jul. 2000, vol. 13, Iss. 3:p. 65, 4 pages.

Keep the Change Savings Service, Bank of America, Retrieved from the internet on Jan. 27, 2006 at <https://www.bankofamerica.com/deposits/checksave/apps/ktc/ktc_terms.cfm>.

Computer Telephony Solutions, The Customer Interaction Specialists, Computer Telephony Solutions, Internet, May 25, 1999.

* cited by examiner

SERVICE CHARGE ADJUSTMENT PLATFORM

CROSS-REFERENCE TO RELATED APPLICATIONS

This application is a continuation of U.S. application Ser. No. 09/660,814, filed Sep. 13, 2000 now U.S. Pat. No. 7,124,111 and entitled SERVICE CHARGE ADJUSTMENT PLATFORM, which claims the priority and benefit of, and incorporates by reference, provisional patent application Ser. No. 60/153,909 filed Sep. 14, 1999 and entitled SERVICE CHARGE REENGINEERING REDESIGN PROCESS MODEL.

BACKGROUND OF THE INVENTION

1. Field of the Invention

The present invention relates to a system and method for enabling receiving, servicing, decision-making on, maintaining and administrating service charge adjustments over an automated platform, and more particularly, to a system and method for providing a fully automated process for receiving a request for a service charge adjustment by a customer, and processing the request within a financial institution prior to delivering a decision on whether to approve the request in a totally paperless environment. Important components of the system and method include an integrated platform that supports customer requests for service charge adjustments; links to other account systems to validate customer fees, and profitability and workflow/decision-making software. The term integrated platform refers to the capability of the present invention to provide customers and customer service representatives with the opportunity to process customer requests through a single system architecture, automatically, and in a paperless environment.

2. Related Art

Service charge adjustment systems, which utilize electronic transmission of customer account data and adjustments to accounts on-line have been developed. In these systems, customers provide account holder and fee data which is sufficient to determine the validity of a service charge to an account record and provide a card for cash funding. Customers generally are required to provide sufficient detail of the transaction that caused the fee in the form of a receipt, statement, and/or other circumstantial information before the charge can be reviewed and a determination made to approve or deny the request for adjustment.

Customer information system and/or processes have also been developed to allow non-electronic requests to be forwarded to a financial institution or other entity by mail, facsimile or other means. The customer provides the same account holder data as required above including the circumstances surrounding the charge in question, and forwards the information to the entity for processing and decision. The financial institution or other entity subsequently reviews the information and provides the customer with a response to the request in the form of a credit notice or reason for denying the request.

Customer access websites are currently under development and are available on the Internet. These systems typically require the customer to provide the same account information as required above, and generally involve a back-office area that reviews and researches the request. Usually the back-office receives the request and some form of research of the information prior to a decision to refund the fee or deny the request.

The process steps and/or systems to be provided in the present invention may be individually available through other companies and/or financial entities. However, there is no known integrated, seamless automated system in existence that can support an end-to-end "one and done" process on a single platform. Further, no financial institution or other entity is able to offer the ability for reviewing and processing customer requests across multiple lines of business, as in the present invention, or to support a fully automated, paperless process for the receiving, researching, decision-making and monitoring of such customer requests

SUMMARY OF THE INVENTION

In order to overcome the disadvantages in the art of the decision-making process in adjusting or waiving fees for service charges, the present invention provides a software and hardware system with increased diversity in the delivery of electronic decision-making in a virtually paperless, electronic method.

The present invention is a software driven system that is capable of accepting customer data in a plurality of diverse media and formats over numerous, different communication channels. Customers or customer service representatives can submit all the required account holder information on-line in a secure environment. The electronic research and decision-making processes are accessible via data feed, and is also accessible on the Internet. An embodiment of the present invention will be part of but not limited to Chase.com, Global Workspace, Chase Online Banking for Consumer and/or Small Business, or standalone.

The drawbacks of the prior art have been ameliorated and the above and other objects of the invention have been realized in the form described below, by the Service Charge Adjustment ("SCA") platform inventors who have worked under the auspices of the assignee of the present invention, The Chase Manhattan Bank ("Chase").

The present invention, referred to as the Service Charge Adjustment platform, is designed to automatically receive information from a customer service representative or customer, with a means to automatically process the information as indicated, and automatically respond in an appropriate manner. In contrast, in today's environment, similar systems require either human intervention in the form of determining the applicability of the request, reviewing current account information, or other forms.

An integral part of the system and method of the invention is the incorporation and integration of middleware and workflow technology to support business rules and business roles in making a decision regarding a request for fee adjustment, refund or waiver. The workflow system contains the business rules and roles to determine a consistent and intelligent decision for a service charge adjustment request (i.e. approved, denied or referred for further research), based on the customer's relationship and profitability. The SCA platform interacts with the bank's financial and accounting systems to retrieve the data needed to support the business rules (e.g., a customer account record, applicability of the charge, account profitability) as a means of determining whether to approve, deny or refer the request. The middleware system updates the SCA Relational Database real-time, with all service charge adjustment requests to facilitate problem analysis. The system also interacts with various lines of business data banks containing customer account information, transaction histories, current transaction activity, and derived analytical and statistical data as well as external sources of information such as the Internet.

The processes and methods in the present invention utilize existing technology including but not limited to WORK-FLOW TECHNOLOGY, BUSINESS RULES/ROLES DECISION SYSTEMS, LOTUS NOTES and/or other email systems, TOUCHPOINT and other front-end screen technology, middleware, and other such technology as known in the art. At the point of receipt, the SCA platform electronically transmits the customer data to the line of business (LOB) accounting system, which reviews the customer account data including but not limited to validity of the service charge, account profitability, coupled with the business rules that consider high value customer protocols, one time courtesy policy, bank error criteria, customer error criteria and threshold amounts. The business rules and roles dictate representative empowerment levels. The platform contains built-in decision-making functions triggered by the business rules and roles, that allow for flexibility not currently available in an integrated platform in the art.

The system in the present invention allows interaction of proprietary financial and accounting systems across lines of business either domestically or internationally in a manner well known in the art. Additional applications include a relational database for capturing and monitoring all requests and transactions. Examples of data capture on the relational database include all service charge adjustment requests, and pertinent indicative information received via the middleware system, predefined queries and filters to assist in reviewing profitability measures, excessive adjustments and fraud criteria and customized Management Information Systems (MIS) for review and reporting purposes.

The SCA platform is used for a plurality of purposes including: 1) decision-making system for determining whether to approve/deny/refer customer requests for service charge adjustments; 2) monitoring volumes and dollars of service charge adjustments by line of business; and 3) determining root causes for recurring processing errors leading to service charges being levied to customers.

The types of service charges received may include but are not limited to late fees, service fees, overdraft charges, interest charges, and wire transfer fees. Of the fees cited above, those caused by Bank Error or related to High Value Customer and One-Time Courtesy requests are new and have not been systemically included in the current decision-making process capability currently available in the art.

Back-office support for the SCA platform exists in the form of research on requests that cannot be processed at the point of contact (e.g. data not on file, no-match found for customer claim, etc.); support staff to review customer requests received electronically through the Internet or other on-line method; a review group comprised of Audit, Risk Management, Product Management, and Data Security Staff to monitor and respond to customer service charge adjustment transactions; and Customer Service Support which is described in more detail below.

Customer Service for the (i.e. debit card or bank card that allows the customer to access the customer's account) offered to customers via the Electronic Funds Delivery (EFD) platform is provided through multiple channels as the customer chooses. First, the customer has access to all financial and non-financial information on-line via a network connection (such as the Internet) to the financial entity such as Chase.Com, Global Workspace or other such sites. Financial information may include transaction history for master/sub-account card types, and/or individual cards, current balances, balance requirements to fund existing and/or new cards, fee data and the like. Non-financial data includes card status changes, cardholder name/address changes and related data, company profiles (e.g., security access to data, authorized viewers, transactors, etc.).

A second means of customer service is available via direct contact with Customer Service Representatives (CSR), or telephone-based CSR within the line of business or at centralized call centers. CSRs have on-line access to financial and non/financial data to respond to customer inquiries and/or requests for information.

Customers have the option to view the financial data on-line, print the data locally, and/or have, a hard copy statement provided to them.

Other features and advantages of the present invention will become apparent from the following description of the invention, which refers to the accompanying drawings.

BRIEF DESCRIPTION OF THE DRAWINGS

For the purpose of illustrating the invention, there are shown in the drawings embodiments which are presently preferred, it being understood, however, that the invention is not limited to the precise arrangements and instrumentalities shown.

DETAILED DESCRIPTION OF EMBODIMENTS OF THE INVENTION

Figure 1:
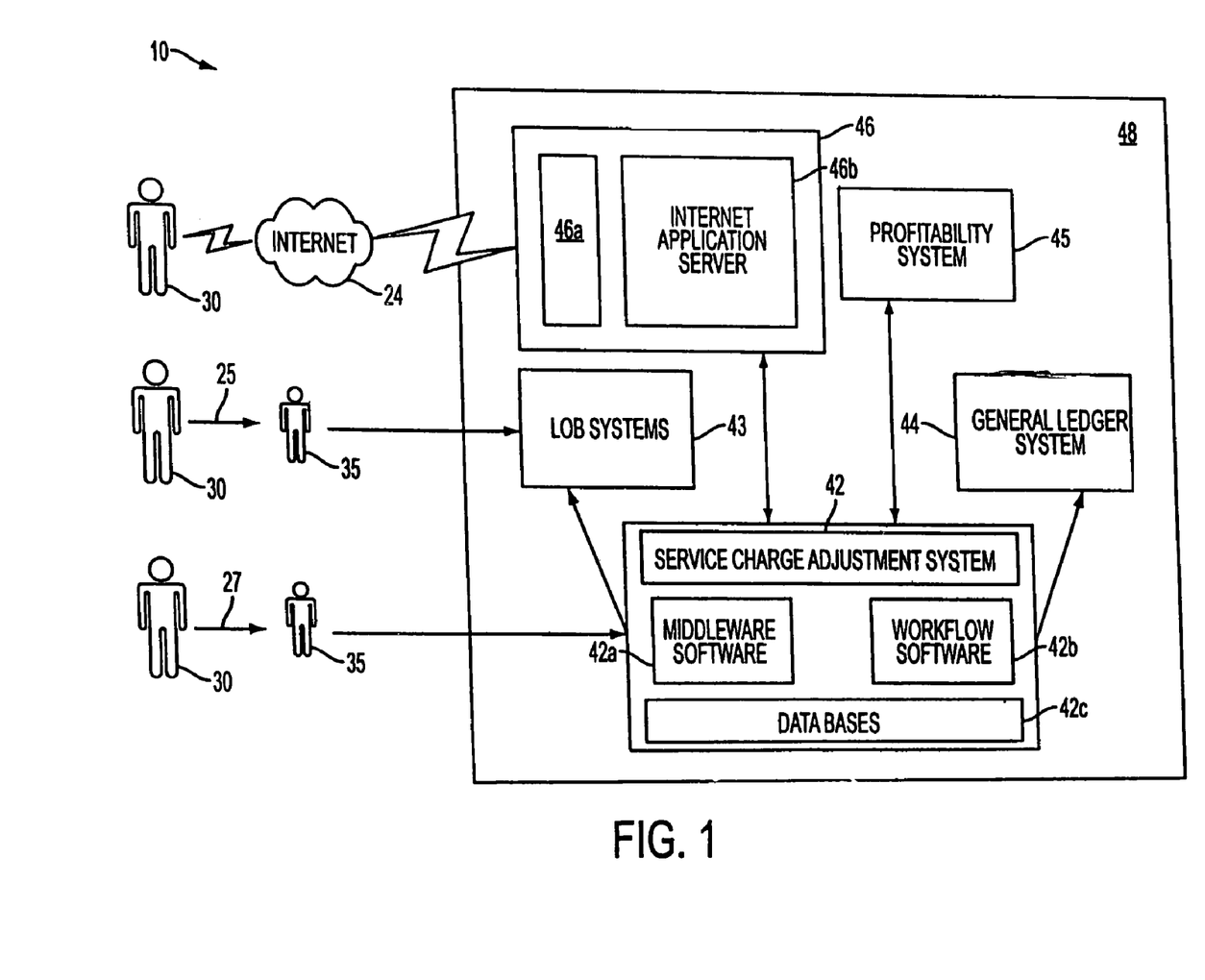
FIG. 1 is a block diagram illustrating a system suitable for providing customers and/or CSRs with an opportunity to electronically open an inquiry on a SCA request.

Referring to the drawings wherein like numerals indicate like elements, there is shown in FIG. 1 a block diagram of a system which is capable of providing customers 30 with an opportunity to establish a claim or inquiry about a service charge via, for example, 1) transmission of data over a network, such as the Internet 24; 2) via facsimile or mail 25; or 3) via direct contact 27 with CSRs at a branch or call center.

The system shown generally as 10, includes a service charge adjustment (SCA) platform 48 that is preferably a part of a financial services provider (not shown) such as a bank. SCA platform 48 includes a network interface 46 which preferably includes at least a firewall 46a and an Internet application server 46b. SCA platform 48 also includes a profitability system 45, line of business (LOB) systems 43, a general ledger system 44 and an SCA system 42. SCA system 42 includes middleware software 42a, workflow software 42b and databases 42c. The specific functioning of the above elements will be discussed in more detail below.

Customer 30 can request an SCA in at least three basic ways according to the present invention, without limitation.

1. Customer 30 signs on to an electronic network such as the Internet and logs on a site hosted by the financial institution and electronically requests the SCA.

2. Customer 30 communicates by mail, E-mail, facsimile or other written form of communication 25 (referred to as "mail" for the purposes of this application) with the financial institution requesting an SCA. The mail is routed to a CSR 35 who enters the request into the platform 48; or 3. Customer 30 contacts a CSR 35 in person, for example, by visiting a branch office of the financial institution or by telephone. The CSR enters customer 30 request and informs customer 30 of the decision.

Preferably, SCA platform 48 maintains an electronic site, such as a website, which is accessible over the Internet 24 or other network (e.g., intranet, etc.) to which customers 30 may connect in a manner well known in the art. Preferably the website maintained by the service charge adjustment platform 48, is hosted in a shared operating system environment consistent with bank standards and infrastructure.

The website preferably permits customers 30 to provide sufficient information to SCA platform 48 to establish a record of the transaction in question, initiate research on the inquiry, and render a decision on whether to approve, deny or refer the customer request for further consideration.

As discussed previously, customer 30 is provided with at least three ways to initiate an SCA request. Customer 30 may contact the SCA platform through mail 25. Mail 25 is read and processed by CSR 35 and directed to the appropriate LOB 43 which forwards it for processing by the SCA platform 48. It is preferred to respond to customer 30 in the same manner in which the request was received (i.e., mail, facsimile or E-mail).

Customer 30 may also initiate an SCA request "in person" with CSR 35 who has access to the SCA platform 48 where the request is then processed by the SCA platform 48 and the result (approve, deny or send for further consideration) is communicated to customer 30 by CSR 35.

Figure 2:
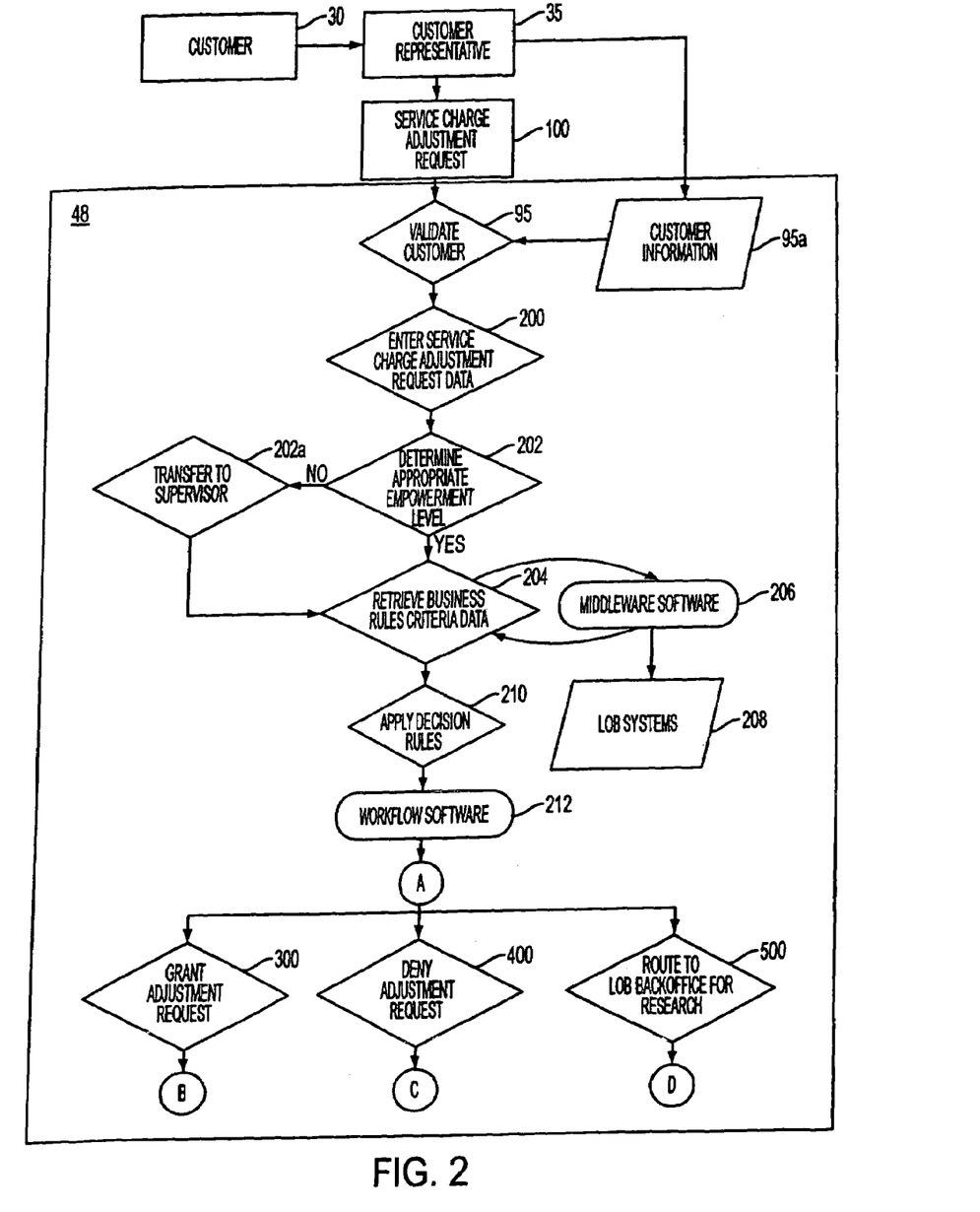
FIG. 2 is flow diagram illustrating the control steps performed by the SCA system for opening SCA inquiries via person to person contact with a customer service representative according to the present invention.

Reference is now made to FIG. 2, illustrating a flow diagram for the control sequences performed by SCA platform 48 for customers 30 who contact CSR 35 in person at a call center or other point of contact or by telephone. Reference numeral 100 indicates the sequences performed by a CSR 35 to initiate an inquiry for an adjustment to a service charge. To facilitate the initiation of the customer inquiry, CSR 35 receives customer information 95a which typically includes name, account number, date of transaction, dollar amount of service charge, product or service, reason for inquiry/claim, and such additional data that may be requested or required.

SCA platform 48 utilizes customer information 95a to establish the validity of the inquiry 95.

Control sequence 200 involves the electronic opening of an inquiry by the CSR 35 in a paperless manner by entering the SCA request data 200. At control sequence 202, the CSR 35 determines whether the amount of the adjustment in question is within his or her empowerment threshold as set in each line of business 202. For amounts that exceed the empowerment threshold, the representative refers the inquiry to a supervisor 202a who performs the remaining steps as outlined below. To initiate sequence 204, the system retrieves the business rules data 204 and transmits the information to middleware software 206 which in turn passes it to business systems 208. Line of business (LOB) systems 208 is required to review the data, establish an inquiry record and to initiate research when required.

Once the data passes through middleware software 206 to the appropriate line of business 208 from which the charge was levied, the data preferably loops back through Middleware software 206 to the business rules criteria 204.

At step 210, service charge adjustment platform 48 applies the decision rules and preferably provides the CSR 35 with an electronic file in the same format as the data was received, with information including account holder name and Social Security number (as provided by the customer) and passes the information to workflow software 212 to implement a decision on whether to grant 300, deny 400 or route the inquiry to the line of business backoffice for further research 500. More detail regarding steps A, B, C and D is provided below.

Figure 3:
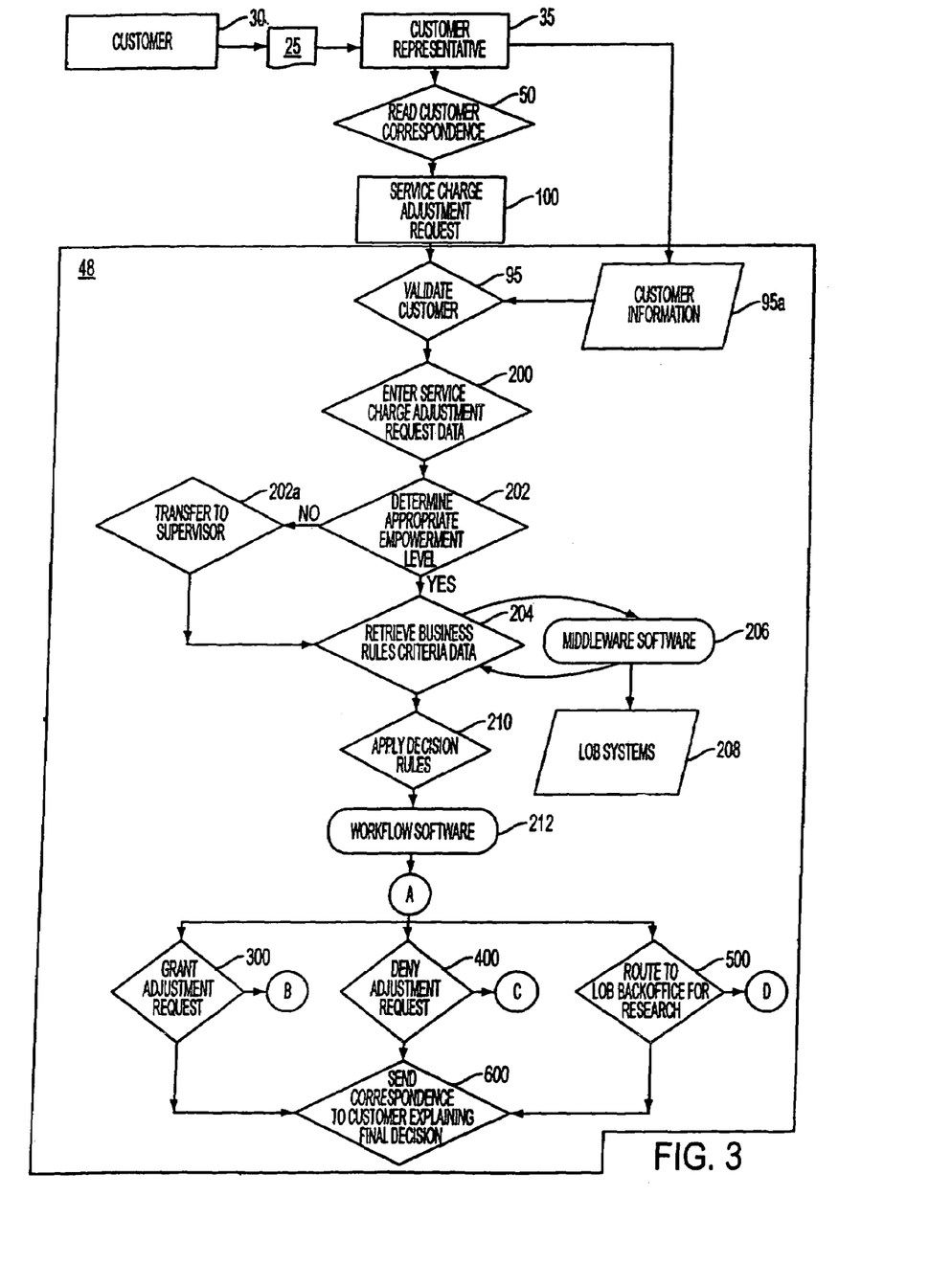
FIG. 3 is a flow diagram illustrating the control steps performed by the SCA system when a customer contacts the financial institution via mail (e.g. mail, e-mail or facsimile).

Reference is now made to FIG. 3 that illustrates a flow diagram for the control sequences performed by SCA platform 48 for customers 30 who contact the provider by mail, facsimile, e-mail or other similar means 25. Reference numeral 50 is the step performed by CSR 35 which includes reviewing the incoming correspondence 25 from customer 30. As described previously, CSR 35 initiates a SCA request 100 as well as enters customer information 95a which is included in mail 25 in order to validate the inquiry 95. At control sequence 200 the CSR 35 initiates the adjustment inquiry using all steps as noted in FIG. 2. Additionally, because customer 30 contact is initially made by mail 25, the decision to grant 300, deny 400 or refer 500 along with an explanation of that decision is preferably communicated to customer 30 using the same method as the original mail 25 (i.e. mail, facsimile, e-mail or the like) 600.

Figure 4:
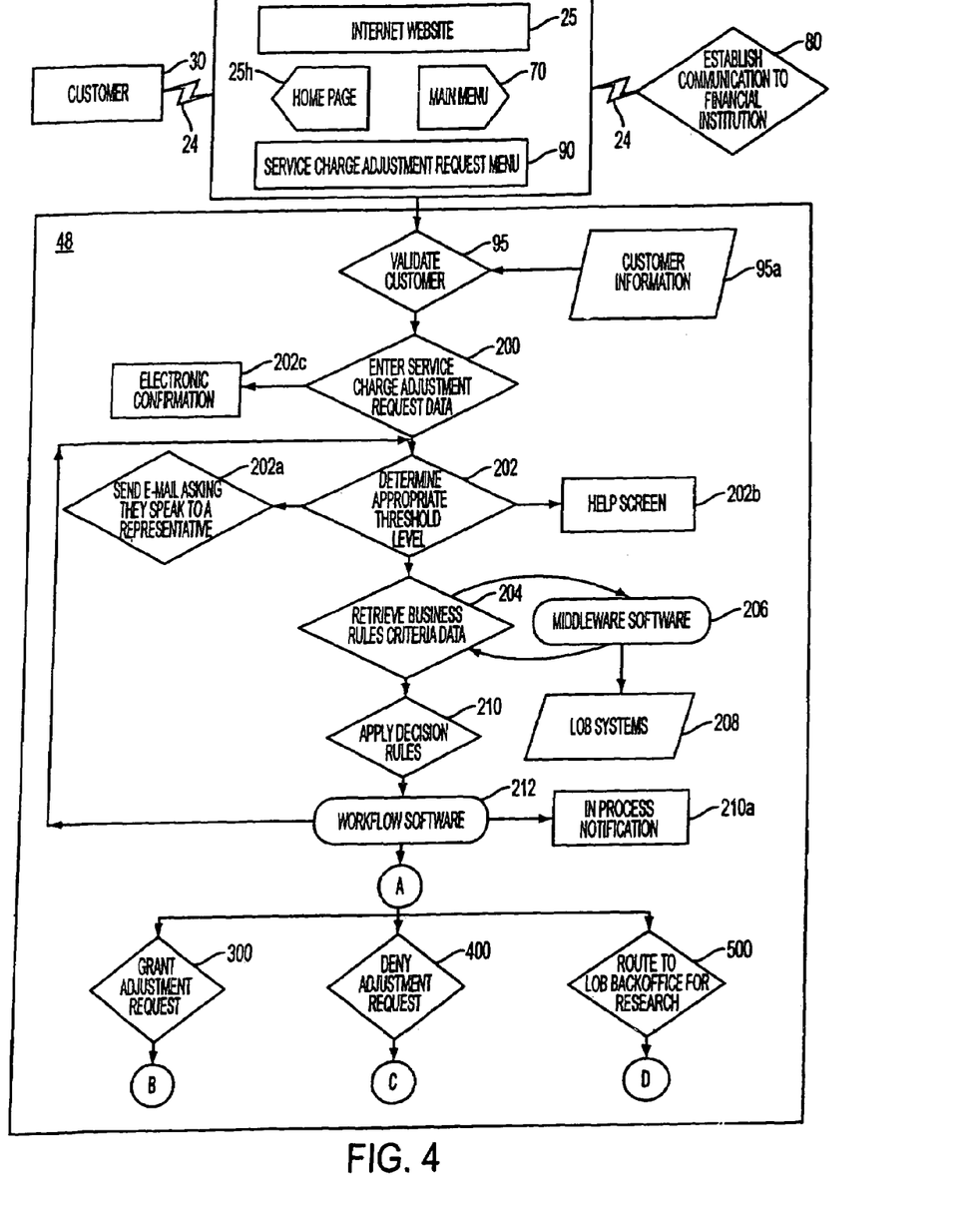
FIG. 4 is a flow diagram illustrating further the control steps performed by the SCA system when a customer initiates a request for an SCA using an electronic network (i.e. the Internet) according to the present invention.

Reference is now made to FIG. 4 that illustrates a flow diagram for the control sequences performed by service charge adjustment platform 48 for customers 30 who contact the provider by using an electronic network, preferably the Internet 24. Customer 30 initiates an inquiry for an SCA request by selecting the appropriate "clickable" links. Customer 30 is preferably guided to an Internet website 25 which includes a welcome log-in screen as is known in the art on a homepage 25h maintained by the provider. Preferably, homepage 25h is hosted by an Internet application server 46b (FIG. 1) which provides the necessary interconnectivity. Security considerations such as maintaining user names and passwords is also a function of network interface 46 (FIG. 1). Customer 30 is presented with the opportunity to request an SCA by entering the required information preferably by interacting with main menu 70. Internet website 25 preferably establishes communication with the financial institution 80 in order to allow customer 30 access to SCA platform 48 (FIG. 1) via financial software that may include but is not limited to Chase.Com, Chase On-line Banking, or other such program.

Once communication with the financial institution has been established 80, customer 30 is given access to service charge adjustment request menu 90 located on Internet website 25. Service charge adjustment request menu 90 preferably provides customer 30 with an electronic screen provided over Internet 24, prompting customer 30 to select from a plurality of sequence choices. Main menu 25m located on website 25 links to service charge adjustment request menu 90 allowing customer 30 to interact with SCA platform 48. Customer 30 is preferably prompted to enter a sign-on and password to establish communication with financial institution 80 access via Internet 24 or other means. This access 80 preferably passes through a firewall 46a to Internet application server 46b (FIG. 1) establishing communication between the provider and customer 30.

Once communication is established, customer 30 enters customer information 95a sufficient to validate the service charge adjustment request 95 as discussed above. Because customer 30 is interacting with a website 25, selections are preferably executed by way of a command (via an icon, input dialogue box, or similar means) as is known in the art.

At control sequence 200, customer 30 selects the service-charge adjustment request option from the menu (not shown). Customer 30 may be required to re-enter account holder data including name, address, date of service charge transaction, service charge amount, reason for inquiry and/or request for adjustment, and any other data that may be requested or required. However, it is preferable to record this information from step 95 without requiring customer 30 to re-enter the information. SCA platform 48 preferably provides an edit/validation message (e.g., data missing, or incorrect format etc.) to customer 30 if the request cannot be processed as entered. Customer 30 is preferably provided with an electronic confirmation that the information was received 202c. Other options available to customer 30 at step 200 include sending an e-mail asking to speak with a CSR 202a and obtaining additional information by referring to help screens 202b.

At step 204, the service charge adjustment request enters the review process as previously described except that the decision to grant 300, deny 400 or refer 500 is preferably displayed to customer 30 on website 25. A confirmation of the decision is preferably sent to customer 30 (not shown).

Preferably website 25 permits customer 30 to loop back to, for example, main menu 70 (by activating an appropriate icon or other means) at substantially any point during the control process flow as is known in the art (not shown).

Figure 5:
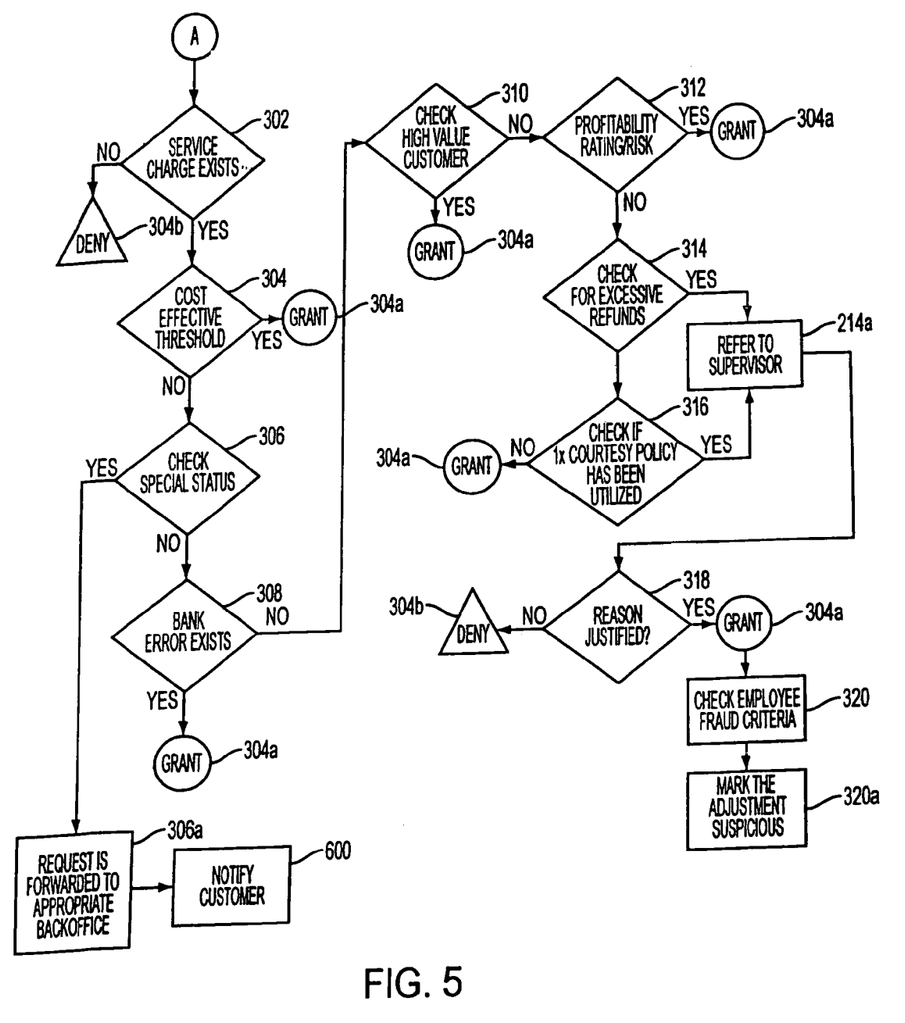
FIG. 5 is a flow diagram illustrating the control steps performed by the SCA system in making a decision regarding the SCA request according to the present invention.

Reference is now made to FIG. 5 that illustrates a flow diagram for the business rules and roles for SCA platform 48. At control sequence 302 (from A, FIGS. 2, 3 and 4), service charge adjustment platform 48 validates that a service charge exists, and enters the business rules process. At steps 304, 306, 308, 310 and 312, if the customer meets any of the criteria as set by the line of business, the request will be granted 304a. The business rules are designated so that each element will be checked in sequence to determine whether to grant, deny or refer the request for further consideration.

If a special status exists 306, the request will be forwarded to the appropriate backoffice area for follow-up 306a and the customer 30 will be notified 600. In the case where the request is due to a bank error 308, the request will always be granted 304a. The request must also be checked (when denied) to see if it originates from a high value customer 310, in which case it will be granted 304a. However, if granting a request will change the status of a customer from profitable to unprofitable 312, the request is next checked for excessive refunds 314 and referred to a supervisor 314a to review and/or override if there are an excessive number of refunds. If there have not been excessive refunds (as determined by the appropriate line of business rules) the request is checked to see if a one-time courtesy adjustment has been granted and if a one-time courtesy adjustment has not been previously applied, the request is granted 304a. If a one-time courtesy credit has already been applied, the request is routed to supervisor 314a for further consideration 318. If the request is not justified, the request is denied 304b. Additionally, it is preferred, that when a request has been granted by a supervisor even, though there have been an excessive number of requests (on the assumption that they are justified) 304a, the decision is forwarded to an employee fraud criteria system 320 where the adjustment can be marked as suspicious 320a.

A certain number of requests can also be forwarded to the employee fraud criteria system 320 on a random or systematic basis.

Figure 6:
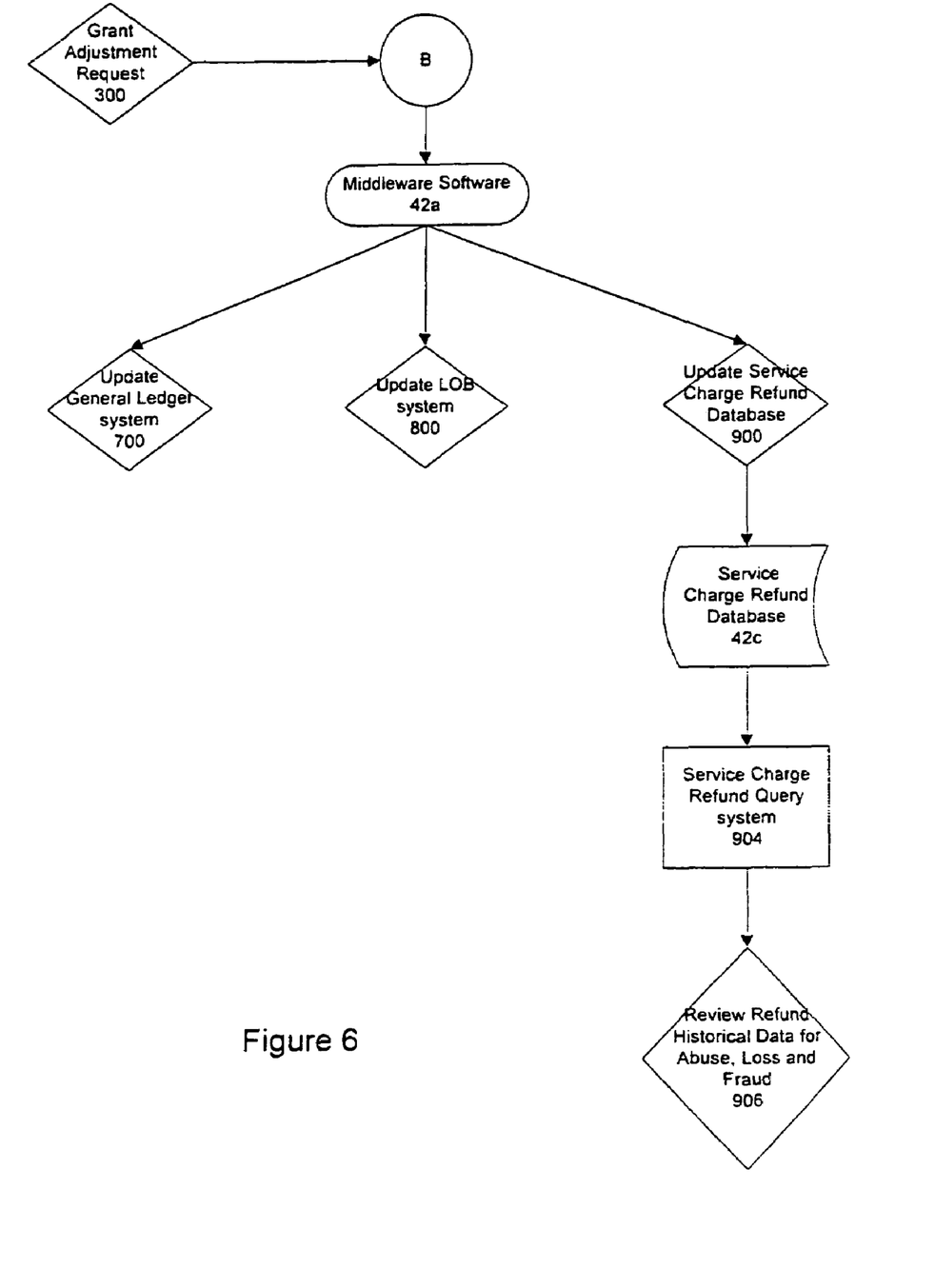
FIG. 6 is a flow diagram showing the steps involved when an SCA request is granted.

Reference is now made to FIG. 6 that illustrates a flow diagram for the control sequences performed by service charge adjustment platform 48 received via workflow software 212 when granting an adjustment request 300 (see B in FIGS. 2, 3 and 4). It is preferred that all service charge adjustment transactions are captured on a service charge refund database 42c via middleware software 42a (900). Control sequences 700, 800, and 900 include but are not limited to updating the General Ledger system 700, updating the LOB system 800, and/or updating the service charge refund database 900. Service charge refund database 42c captures all transactions in a manner that allows MIS reports, queries, and on-line reviews of past and present revise or create history. At control sequence 904, a review group is provided with at least, but not limited to, an opportunity to perform account review, maintenance, monitoring and administration functions including reviewing historical data for abuse, loss or fraud, revise or create help screen, and email access for inquiry capability 906.

Figure 7:
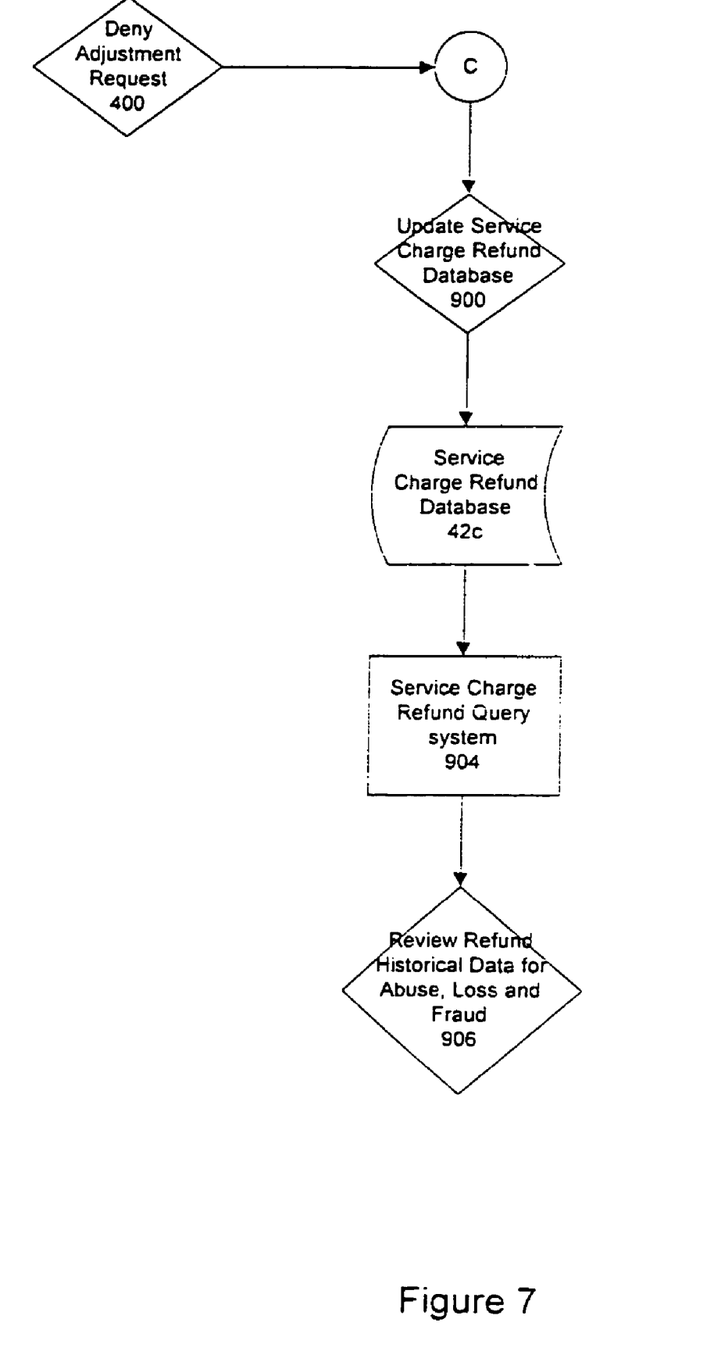
FIG. 7 is a flow diagram outlining the steps taken by the present invention when an SCA request is denied.

Referring now to FIG. 7, a flow chart outlining the steps involved in a decision to deny refund request 400 (see C in FIGS. 2, 3 and 4), service charge refund database 42c is updated 900. Service charge refund database 42c captures all transactions in a manner that allows MIS reports, queries, and on-line reviews of past and present service charge history 902. Again, as discussed above at control sequence 904, a review group is provided with an opportunity to perform the functions as above.

Figure 8:
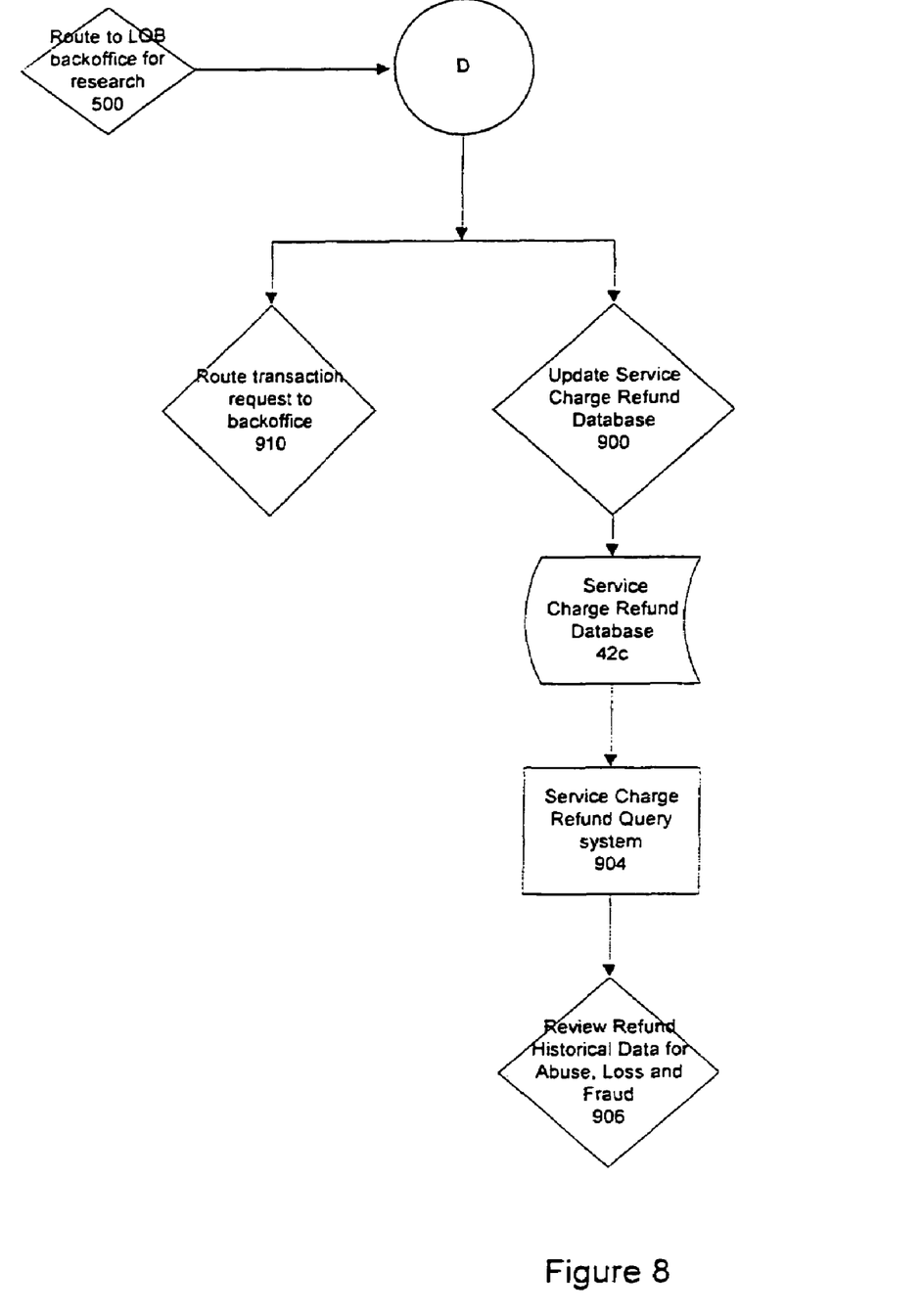
FIG. 8 is a flow diagram illustrating the steps according to the present invention when an SCA request is referred for further consideration.

The case where the request must be examined by backoffice before further action is detailed in FIG. 8. In addition to routing the transaction request to backoffice 910, functions 900, 902, 904 and 906 are also performed as outlined above.

The invention provides a flexible and broad based systems platform that enables customer service representatives and/or customers to enter customer-specific data into present fields, manually or from a customer/representative-specific system download, and electronically submit the information for service charge review/decision-making purposes.

Technology Design

Service Charge Adjustment platform 48 incorporates middleware software and workflow software. Inputs and outputs to the middleware/workflow systems are preferably provided via TOUCHPOINT or other such system at points of contact (branch/call center). The workflow system contains the business rules and roles to determine a consistent and intelligent decision for a service charge adjustment request (i.e. approved, denied or routed) based on a customer's relationship and profitability. Additionally, the middleware/workflow system 42 interfaces with various line of business systems to retrieve the data needed to support the business rules and send the approved transactions for update purposes. The middleware system updates the SCA relational database 42c real-time, with all service charge adjustment requests to facilitate problem analysis. An overview of the component functionality is shown below:

Middleware/Workflow System
  Requests received are processed by the workflow system rules engine 42b. The rules engine controls how SCA requests are written to the SCA relational database 42c. Approved requests are routed to the appropriate line of business system for process completion.

The rules engine 42b determines proper levels of empowerment for the point of contact staff and proper threshold amounts.

The middleware/workflow system 42 performs all required functions including creating records on the relational database for each approved SCA request, and initiates activities routed to LOB, based on established parameters for SCA requests requiring more research.

The workflow system 42b also provides various administrative functions including proof & control, back-up & recovery, and MIS.

Email Messaging

E-mail messages are sent to various business areas and departments advising them of excessive refunds on a customer's account, excessive refunds by particular employee or point of contact, or loss of profitability because of a service charge is adjustment. Any other issues identified are routed via e-mail.

E-mail messages are received from various business areas and departments initiating requests to research a service charge adjustment request prior to approval.

E-mails received are automatically received by the Workflow system real-time. Once approved, important information (i.e. amount, date, account number) is automatically captured and written to the SCA Relational Database.

Although e-mail is the preferred form of communication, it is readily apparent to one skilled in the art that any other satisfactory form of communication could be utilized without departing from the spirit of the present invention.

SCA Relational Database

All service charge adjustment requests and pertinent indicative information received via the middleware system 42a, are organized and stored on a relational database 42c.

The SCA relational database 42c includes predefined queries and filters to assist the review group in making decisions (i.e. profitability measures, excessive adjustments and fraud criteria). The information is retrieved and displayed in a customized format.

A bridge to the middleware system allows information required on the customer's account that resides on the line of business systems 43 to be retrieved (e.g. customers who opened an account in the past 6 months).

Reports can be customized to facilitate analysis and review of the service charge adjustment data.

Electronic data is preferably received and electronically downloaded to financial and customer information systems for automated decision-making. The SCA system 10 is preferably operated in such a manner to support fairly unlimited scale and is able to become a module of a customer banking system, integrated into an Internet banking platform for consumers and/or small business, or standalone.

The Line of Business (LOB) Decision Path is preferably incorporated into the workflow processing environment 42 to provide each LOB 43 with the capability to determine how service charge adjustment requests will be handled based on the following criteria:

Point of Contact Empowerment Level—depending on the level of empowerment granted to each staff person handling an adjustment request, that request may be granted/denied, or routed to the LOB back-office for additional research.

Threshold Dollar Amounts—each LOB has a dollar limit imposed for the various levels of staff to determine if additional manager approval is needed or to route the request to their back-office.

Referral to the Back-Office—ability for each LOB to develop criteria for when a request should be routed to their back-office for further research.

Each LOB determines the business rules and roles for who can grant a service charge adjustment for other LOB based on the following criteria:

Staff Level (i.e. clerical, supervisor)—each LOB determines the dollar amount allowed for an adjustment based on the staff level handling the request, and the approval level required.

Dollar Amount of the Adjustment—Specific dollar threshold levels are determined based on the service charge, the product, and the staff level handling the request.

The Workflow environment preferably provides the following features and functions:

Base Requirements

Existence of service charge being refunded—a service charge adjustment/refund is allowed only if the charge exists in the time period specified and has not been previously refunded/adjusted. A refund/adjustment that exceeds the amount of an actual charge will not be allowed.

High Value Customer protocols—each LOB identifies the customer base parameters for coding a customer as High Value.

One-Time Courtesy policy—each LOB determines the time frame and justification for when a one-time courtesy may be granted.

Reason for adjustment—each LOB specifies the reasons/circumstances for which an adjustment/refund request will be granted/denied.

Bank Error criteria—a set of rules are established on how to handle bank errors in the adjustment/refund process. A customer's history will not be a determining factor in this case.

Customer Error criteria—each LOB determines how to handle a customer error based on prior adjustment history for the customer, the customer's profitability level, whether the customer is a High Value customer, or if the customer has already been granted a one-time courtesy adjustment.

Profitability Measures

High Value Customer protocols—as stated in base requirements above.

Balances Maintained—Each LOB determines the profitability for a customer based on deposit balances, credit balances, loan balances, etc.

Products utilized—the number of products/services used by the customer and overall contribution level is used to determine the customer's profitability.

Service Charges incurred for the year—the dollar amount of service charges a customer has incurred for the year, how much was refunded or paid in full, is used in determining if a refund is warranted.

Excessive Refund Criteria

Volume of prior adjustments—the number and dollar amount of prior adjustments by a customer will be a consideration in granting/denying an adjustment request. Adjustments that would turn a profitable account unprofitable may not be granted.

Reasons for adjustments—reason codes defining why a customer has requested prior adjustments are used to determine if the request should be granted.

Fraud Criteria

Point of Contact processing adjustments—determine if the representative has frequently granted adjustments to the same account.

Reasons for adjustments—determine if the same reasons are continually used for granting an adjustment (e.g. one-time courtesy).

Prior adjustments performed—monitor prior adjustments performed by a specific individual or account to determine if charges are infrequently paid or are fraudulent.

Dollar amount of adjustments—determine if specific representative has refunded large amounts of adjustments compared to other representatives.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. Apparatus for providing a customer with an opportunity to request a refund or waiver of a fee or charge on a customer account, the apparatus comprising:
   a network interface for sending and receiving a customer request for a refund or waiver of a fee or charge over an electronic network;
   a service charge adjustment system coupled to the network interface, the service charge adjustment system including processing components for automatically performing at least the functions of:
      receiving, through the network interface, the customer request to refund or waive a fee or charge on the account, wherein the request for refund or waiver relates to a charge or fee posted against the customer account;
      delivering the customer request to an automated interface of the service charge adjustment system,
      establishing validity of the customer request by validating the existence of a service charge;
      retrieving data for evaluation; and
      applying at least one business rule to the retrieved data to determine whether the customer request should be granted, the retrieved data including at least customer account information;
      automatically rendering a decision on the customer request using the automated interface; and
      presenting the customer with the decision, wherein the decision is one of the following: granting a refund or waiver request, denying a refund or waiver request, and referring a request to an external system for further consideration.

2. The apparatus of claim 1, wherein the network interface is further operable to perform the function of:
   maintaining an electronic site on the electronic network to which the customer may connect.

3. The apparatus of claim 2, wherein the network interface is further operable to perform the function of:
   presenting at least a first electronic screen over the electronic network to the customer who has connected to the electronic site.

4. The apparatus of claim 1, wherein the automated interface is further operable to perform the functions of:
   requesting at least a first customer information; and
   validating the first customer information.

5. The apparatus of claim 4, wherein the first customer information includes at least the following:
   a user name; and
   a password.

6. The apparatus of claim 5, wherein the first customer information also includes at least the following:
   name and address of the customer; and
   date of service charge transaction.

7. The apparatus of claim 1, wherein, if the service charge is valid, including the step of denying said refund or waiver request.

8. The method of claim 1 wherein the retrieved data comprises:
   (1) effectiveness of granting the request, (2) customer special status, (3) existence of a bank error, (4) customer value, (5) profitability of granting the request, (6) a predetermined number of previous requests from the customer, (7) whether at least one courtesy refund or waiver has been granted to the customer, or (8) whether the request is justified.

9. The method of claim 1 wherein the retrieved data comprises: profit, longevity, number of past requests, number of open accounts or premium features.

10. A computer-implemented method of providing a customer with an opportunity to request a refund or waiver of a charge or fee on a customer account comprising the steps of:
    receiving a customer request to make a refund or waiver of a charge or fee, the request received over a network at a service charge adjustment system, wherein the request for refund or waiver relates to a charge or fee posted against the customer account;
    delivering the customer request to an automated interface of the service charge adjustment system, the service charge adjustment system having processing components for processing the customer request, the processing comprising:
       establishing validity of the customer request by validating existence of the service charge;
       retrieving data for evaluation of the customer request;
       applying business rules to the retrieved data to determine whether the customer request should be granted, the retrieved data including at least information regarding the customer account;
       automatically rendering a decision on the request using the automated interface; and
       presenting the customer with the decision with respect to the request, wherein the decision is one of the following: granting a refund or waiver request, denying a refund or waiver request, and referring a request to an external system for further consideration.

11. The method of providing a customer with an opportunity to request a refund or waiver according to claim 10 further comprising the steps of:
    maintaining an electronic site on a computer network to which the customer may connect.

12. The method of providing a customer with an opportunity to request a refund or waiver account according to claim 11 further comprising the steps of:
    presenting at least one electronic screen over the network to the customer who has connected to the electronic site, at least one screen including at least a first input field operable to receive the request from the customer.

13. The method of providing a customer with an opportunity to request a refund or waiver according to claim 11 wherein the computer network is the Internet.

14. The method of providing a customer with an opportunity to request a refund or waiver according to claim 13 wherein the request is delivered by contact with a customer service representative prior to transmission over the network.

15. The method of providing a customer with an opportunity to request a refund or waiver according to claim 14 wherein the contact is made over a communication network.

16. The method of providing a customer with an opportunity to request a refund or waiver according to claim 15 wherein the communication network is a telephone system.

17. The method of providing a customer with an opportunity to request a refund or waiver according to claim 15 wherein the communication network is the Internet.

18. The method of providing a customer with an opportunity to request a refund or waiver according to claim 14 wherein the contact is made directly in person with the customer service representative.

19. The method of providing a customer with an opportunity to request a refund or waiver according to claim 11 wherein the electronic site is a website.

20. The method of providing a customer with an opportunity to refund or waive a fee or charge according to claim 19 wherein the website is hosted in a shared operating environment.

21. The method of providing a customer with an opportunity to request a refund or waiver according to claim 10, wherein the request is made across a computer network.

22. The method of providing a customer with an opportunity to request a refund or waiver according to claim 10 wherein the request is received by facsimile prior to transmission over the network.

23. The method of providing a customer with an opportunity to request a refund or waiver according to claim 10 wherein the request is delivered by mail prior to transmission over the network.

24. The method of providing a customer with an opportunity to request a refund or waiver according to claim 10 wherein the automated interface converts a first format of the refund or waiver request to at least a second format for use within the automated interface.

25. The method of claim 10 wherein the retrieved data comprises:
(1) effectiveness of granting the request, (2) customer a special status, (3) existence of a bank error, (4) customer value, (5) profitability of granting the request, (6) a predetermined number of previous requests from the customer, (7) whether at least one courtesy refund or waiver has been granted to the customer, or (8) whether the request is justified.

26. The method of claim 10 wherein the retrieved data comprises: profit, longevity, number of past requests, number of open accounts or premium features.

27. Apparatus for providing a customer with an opportunity to request a refund or waiver of a fee or charge on a customer account, the apparatus comprising:

a network interface for sending and receiving data over an electronic network, the data including a customer request to refund or waive a fee or charge on the customer account;

a service charge adjustment system coupled to the network interface, the service charge adjustment system including processing components performing at least the functions of:

receiving the customer request to refund or waive a fee or charge on the account, wherein the request for refund or waiver relates to a charge or fee posted against the customer account;

delivering the request to an automated interface, the automated interface validating the existence of a service charge;

wherein if a service charge is validated, the automated interface performs at least two of the functions of: (1) retrieving at least one business rule from a business rules database, (2) applying the at least one business rule to arrive at a decision regarding the request, (3) determining the cost-effectiveness of granting the request, (4) determining of the request is justified, (5) checking to see if the customer has a special status, (6) determining if a bank error has occurred, (7) checking to see of the customer is a high value customer, (8) rating the profitability of granting the request, (9) checking to see if the customer has made at least a predetermined number of previous requests, and (10) ascertaining if the customer has been granted at least one courtesy refund or waiver;

automatically rendering a decision on the request using the automated interface, the decision based on the at least two functions; and presenting the customer with the decision with respect to the request, wherein the decision is one of the following: granting a refund or waiver request, denying a refund or waiver, and referring a request to an external system for further consideration.

\* \* \* \* \*